United States Patent [19]
Sato et al.

[11] Patent Number: 5,921,349
[45] Date of Patent: Jul. 13, 1999

[54] OIL AIR LUBRICATING APPARATUS

[75] Inventors: Yukio Sato; Fumio Toyama; Yasushi Amano, all of Kanagawa, Japan

[73] Assignee: NSK Ltd., Tokyo, Japan

[21] Appl. No.: 09/162,503

[22] Filed: Sep. 29, 1998

[30] Foreign Application Priority Data

Sep. 29, 1997 [JP] Japan .................................. 9-263868
Aug. 28, 1998 [JP] Japan ................................. 10-242722

[51] Int. Cl.$^6$ ................................ F01M 1/00; F16N 7/30
[52] U.S. Cl. ...................... 184/6.14; 184/55.1; 384/468; 384/322
[58] Field of Search ................................. 184/6.14, 55.1, 184/6, 6.26, 81; 137/109, 118.01; 384/473, 468, 322

[56] References Cited

U.S. PATENT DOCUMENTS

| | | | |
|---|---|---|---|
| 3,618,709 | 11/1971 | Boelkins | 184/6.4 |
| 4,359,141 | 11/1982 | Schnell | 184/6.26 |
| 5,253,733 | 10/1993 | Miyachi | 184/6.26 |

FOREIGN PATENT DOCUMENTS

WO 97/46825   12/1997   WIPO .............. F16N 7/32

*Primary Examiner*—John A. Jeffrey
*Assistant Examiner*—David Fenstermacher
*Attorney, Agent, or Firm*—Sughrue, Mion, Zinn, Macpeak & Seas, PLLC

[57] ABSTRACT

An oil air distributor is inserted in the inside of a support hole provided in a housing. The oil air distributor is designed so that outer pipes and a spacer fitted onto an inner pipe are held, through seal rings, between a flange portion provided in the inner pipe and a supply plug. In a condition in which the seal rings are compressed axially, the second oil-supply hole provided in the supply plug is communicated with branch passages provided in the housing. Further, a plurality of inner-pipe-side small holes provided in the inner pipe are opened substantially horizontally in vertically even-level positions.

8 Claims, 9 Drawing Sheets

1

OIL AIR LUBRICATING APPARATUS

BACKGROUND OF THE INVENTION

1. Field of the Invention

The present invention relates to an oil air lubricating apparatus, and particularly to an oil air lubricating apparatus for carrying lubricating oil, by air, into the inside of rolling bearings for rotatably supporting a high-speed rotating shaft such as a main shaft of a machine tool, or the like.

2. Description of the Related Art

A machine-tool main shaft rotates at a high speed in use. Accordingly, not only a main shaft of this type is required to be rotatably supported by rolling bearings but also a required minimum quantity of lubricating oil is necessary to be accurately supplied to the inside of the rolling bearings when the main shaft rotates. As an apparatus for supplying lubricating oil to the inside of each rolling bearing in the aforementioned manner, an oil air lubricating apparatus conventionally known is configured such that lubricating oil is fed into the inside of a supply passage so as to be carried through the supply passage by air so that the lubricating oil is supplied to a plurality of portions to be lubricated through a plurality of branch passages branched from the aforementioned supply passage. As such an oil air lubricating apparatus, for example, known are those disclosed in German Patent No. 2844995 and Japanese Patent Publication No. Hei. 5-340499. In those oil air lubricating apparatuses, a proper quantity of lubricating oil can be supplied to portions to be lubricated without being affected by the gravity. FIG. 9 shows the oil air lubricating apparatus disclosed in Japanese Patent Publication No. Hei. 5-340499 as one of those known oil air lubricating apparatuses.

The oil air lubricating apparatus disclosed in Japanese Patent Publication No. Hei. 5-340499 is designed to supply lubricating oil to respective portions to be lubricated, that is, multi-row tapered roller bearing 3 for supporting a rotation shaft 2 so as to be rotatable relative to a housing 1, and contact-type oil seal 4, 4 provided on axially opposite sides of the tapered roller bearing 3. This lubricating oil is of an oil air type in which lubricating oil is carried, by air, from a not-shown oil supply source to the aforementioned portions to be lubricated. To this end, a plurality of branch passages 7a, 7b, 7c and 7d are provided in the housing 1, a collar 5 fixedly connected to the housing 1, and a cover 6; and the respective one ends (lower ends in FIG. 9) of the plurality of branch passages 7a, 7b, 7c and 7d are communicated with the aforementioned portions to be lubricated correspondingly. Among the branch passages 7a, 7b, 7c and 7d, the other ends (upper ends in FIG. 9) of the branch passages 7a, 7b and 7c are opened in lower portions of the inner circumferential surface of a support hole 8 provided in the housing 1 while the residual branch passage 7d is opened in the rear end surface of the support hole 8.

A plurality of circular-pipe-like oil supply passages 9, 9 and a plurality of distributors 10a, 10b and 10c are inserted in the inside of the support hole 8, and the plurality of circular-pipe-like oil supply passages 9, 9 and the plurality of distributors 10a, 10b and 10c are arranged axially serially and alternately so that the inner portions of the passages 9, 9 and distributors 10a, 10b and 10c are communicated with one another. Further, each of the distributors 10a, 10b and 10c has a first through-hole 11 for communicating axially-opposite end surfaces with each other, and a second through-hole 12 for communicating one end with one axial end surface (left end surface in FIG. 9) and the other end with the outer circumferential surface. In the condition in which the distributors 10a, 10b and 10c are disposed in the inside of the support hole 8, other-end openings of the second through-holes 12 are matched with other-end openings of the branch passages 7a, 7b and 7c, respectively. The first through-hole 11 provided in the most downstream side distributor 10c is communicated with the branch passage 7d opened in the rear end surface of the support hole 8.

Further, cylindrical sleeves 13 are disposed, as shown in FIG. 10, in portions inside the circular-pipe-like oil supply passages 9, 9 and just prior to the distributors 10a, 10b and 10c respectively. Each of the sleeves 13 has a plurality of slits 14, 14 arranged circumferentially, and a plurality of protrusions 15, 15 provided so as to be protruded from the outer circumferential surface of the sleeve 13. In the condition in which the sleeves 13, 13 are fitted into the circular-pipe-like oil supply passages 9, 9 respectively, cylindrical fine gaps are formed between the outer circumferential surfaces of the sleeves 13, 13 and the inner circumferential surfaces of the circular-pipe-like oil supply passages 9, 9 by the presence of the protrusions 15, 15.

According to the oil air lubricating apparatus disclosed in Japanese Patent Publication No. Hei. 5-340499 and configured as described above, lubricating oil discharged from the not-shown oil supply source can be distributed, in a proper quantity each time, to the branch passages 7a, 7b, 7c and 7d and to portions to be lubricated which are communicated with the branch passages 7a, 7b, 7c and 7d through the circular-pipe-like oil supply passages 9, 9 and the distributors 10a, 10b and 10c, respectively. Further, because cylindrical fine gaps are formed in portions just prior to the distributors 10a, 10b and 10c by the presence of the sleeves 13, lubricating oil flowing in the fine gaps is spread circumferentially by capillarity even in the case where the quantity of lubricating oil flowing in the circular-pipe-like oil supply passages 9, 9 is so small that the lubricating oil is reserved in lower portions of the circular-pipe-like oil supply passages 9, 9 by the influence of the gravity. Accordingly, proper quantities of lubricating oil can be distributed to the first and second through-holes 11 and 12 respectively.

Though not shown, German Patent No. 2844995 discloses an oil air lubricating apparatus in which a proper quantity of lubricating oil fed into a distributor communicated with one oil supply passage is distributed to a portion to be lubricated and the residual quantity of lubricating oil is distributed to the next distributor. In the structure disclosed in German Patent No. 2844995, therefore, a plurality of first intermediate passages to be communicated with portions to be lubricated and a plurality of second intermediate passages to be communicated with next distributors are opened alternately in places arranged circumferentially in the inner circumferential surface of the distributor communicated with the oil supply passage. According to the oil air lubricating apparatus disclosed in German Patent No. 2844995 and configured as described above, proper quantities of lubricating oil can be distributed without imbalance in any intermediate passage even in the case where the quantity of lubricating oil fed to the distributor is so small that the lubricating oil is reserved in the lower portion of the distributor by the influence of the gravity.

In the oil air lubricating apparatuses disclosed in the Japanese Patent Publication No. Hei. 5-340499 and German Patent No. 2844995, a complex structure is required in order to supply proper quantities of lubricating oil to portions to be lubricated respectively. Accordingly, increase in production cost cannot be avoided. Further, in the case where the number of portions to be lubricated is not smaller than three, distributors not smaller than two are required. Further, while the distributors are assembled in the inside of the support hole provided in the housing, it is necessary to make the positions of openings of the branch passages provided in the support hole and the positions of oil-discharge openings of the distributors coincident with each other. Accordingly, not only an exclusive-use jig for assembling the distributors is required but also the labor required for the assembling work is considerably troublesome.

SUMMARY OF THE INVENTION

It is an object of the present invention to eliminate the aforementioned disadvantages and to provide an oil air lubricating apparatus in which proper quantities of lubricating oil can be distributed while both the cost of parts and labor required for assembling work are reduced.

In order to achieve the above object, according to the present invention, the oil air lubricating apparatus comprises: (1) a housing provided with a support hole; (2) a plurality of branch passages formed in an inside of the housing, the branch passages having respective one ends opened in axially separate positions in an inner circumferential surface of the support hole and respective other ends communicated with portions to be lubricated respectively; and (3) an oil air distributor provided in an inside of the support hole; the oil air distributor including: (3a) an inner pipe having a pipe portion provided with a first oil-supply hole formed in an inside of the pipe portion, the pipe portion being opened in one end side thereof, the inner pipe being inserted into the inside of the support hole; (3b) a plurality of inner-pipe-side small holes provided in an intermediate portion of the pipe portion and formed in axially separate positions respectively so as to communicate inner and outer circumferential surfaces of the pipe portion with each other; (3c) a plurality of cylindrical outer pipes fitted onto the pipe portion and inserted into the inside of the support hole; (3d) outer-pipe-side small holes for communicating outer circumferential surfaces of the outer pipes with bottom surfaces of recessed grooves formed in axially intermediate portions of inner circumferential surfaces of the outer pipes respectively; (3f) a plurality of annular sealing members fitted onto part of the pipe portion and located in positions axially separated from the outer pipes respectively, (3g) means for holding (3a) to (3f) members in the inside of the support hole (a supply plug separate from the inner pipe, or a supply plug portion integral with the inner pipe) holding means having a connection portion which is connectable to an opening end portion of the support hole and a second oil-supply hole which makes axially opposite end surfaces with each other.

In the above oil air lubricating apparatus, inner and outer fringes of the annular sealing members are elastically abutted against the inner circumferential surface of the support hole and an outer circumferential surface of the inner pipe are respectively inner over all surfaces in a condition in which the holding is connected to the opening end portion of the support hole, so that the first oil-supply hole and the second oil-supply hole are communicated with each other, the inner-pipe-side small holes and the outer-pipe-side small holes are communicated with each other, and the outer-pipe-side small holes and the branch passages provided in the housing are communicated with each other.

Further, the oil air distributor preferably further comprises a plurality of recessed grooves being formed at axially different positions on the outer circumferential surface of the inner pipe and having bottom surfaces made to communicate with the inner-pipe-side small holes and a plurality of seal grooves being formed at positions axially apart from the recessed grooves on the outer peripheral surface of the inner pipe over all periphery in place of the outer pipes, wherein a plurality of the annular sealing members are fitted into the seal grooves and the inner pipe is inserted into the support hole, and wherein with the holding means connected to the opening end portion of the support hole, the sealing members are compressed diametrically between the bottom surfaces of the seal grooves and the inner circumferential surface of the support hole and the inner-pipe-side small holes and the branch passages defined in the housing are made to communicate with each other.

In the oil air lubricating apparatus configured as described above according to the present invention, constituent members of an oil air distributor can be handled collectively in a state in which the members are assembled into one body even in the case where the number of portions to be supplied with lubricating oil is not smaller than three. Accordingly, the apparatus is simplified in structure, so that the cost of the apparatus is reduced. That is, an oil supply source communicated with a second oil-supply hole provided in the supply plug can communicate with portions to be lubricated through a plurality of branch passages provided in the housing simply by an operation in which an oil air distributor including a plurality of outer pipes and sealing members fitted onto an inner pipe is inserted in the inside of a support hole provided in the housing and the sealing members are compressed between the supply plug and a flange portion. Accordingly, no exclusive-use jig and complex labor are required for the assembling work to secure the aforementioned communication state. Further, in the oil air lubricating apparatus according to the present invention, if inner-pipe-side small holes are opened substantially horizontally in vertically even-level positions in the inner circumferential surface of the first oil-supply hole, lubricating oil can be fed into the inner-pipe-side small holes uniformly even in the case where lubricating oil is reserved in the lower portion of the inside of the first oil-supply hole by the influence of the gravity.

Further, the oil air lubricating apparatus preferably comprises a plurality of recessed grooves and a plurality of seal grooves on the outer peripheral surface of the inner pipe in place of the outer pipes. Thus, the number of the parts of the oil air distributor can be reduced, the inner pipe forming a part of the oil air distributor can be manufactured at low costs, and moreover the number of fitting steps can be decreased.

DETAILED DESCRIPTION OF THE PREFERRED EMBODIMENTS

Figure 1:
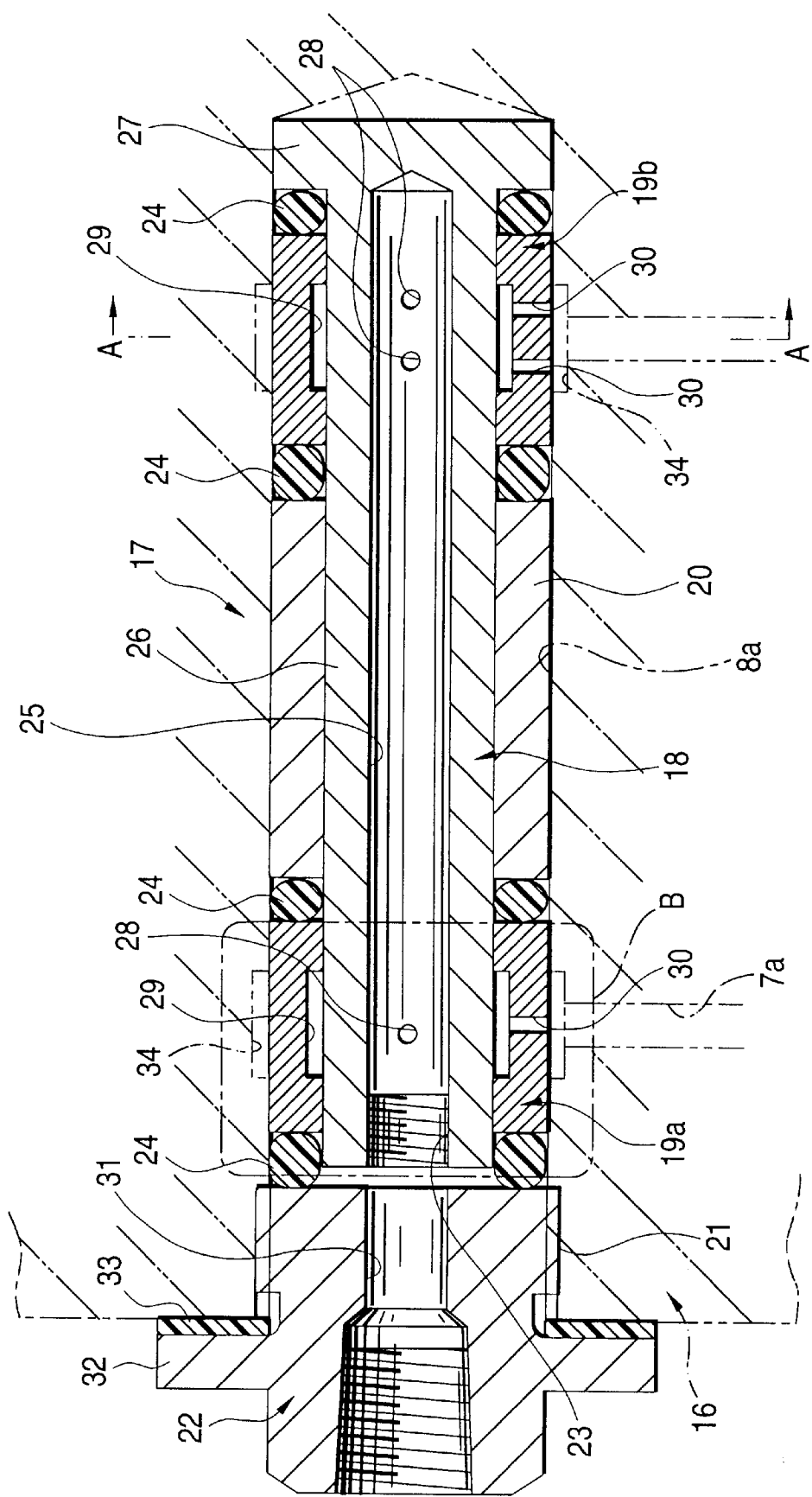
FIG. 1 is a sectional view showing a first embodiment of the present invention.
Figure 2:
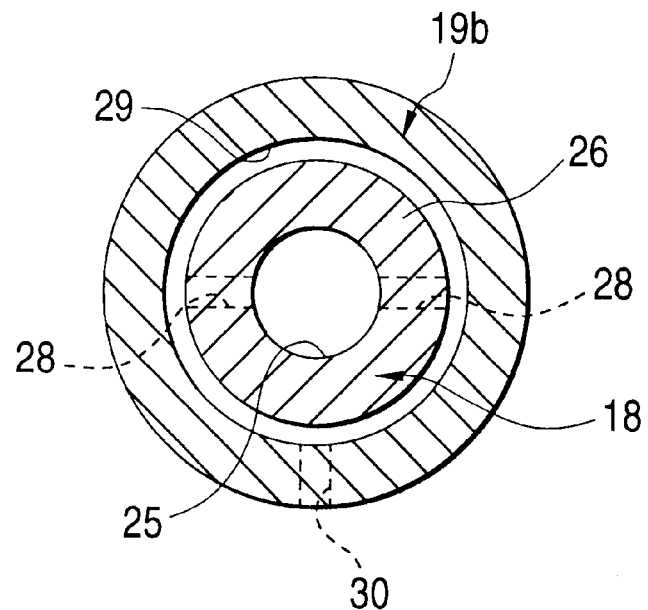
FIG. 2 is a sectional view taken along the line A—A in FIG. 1.
Figure 3:
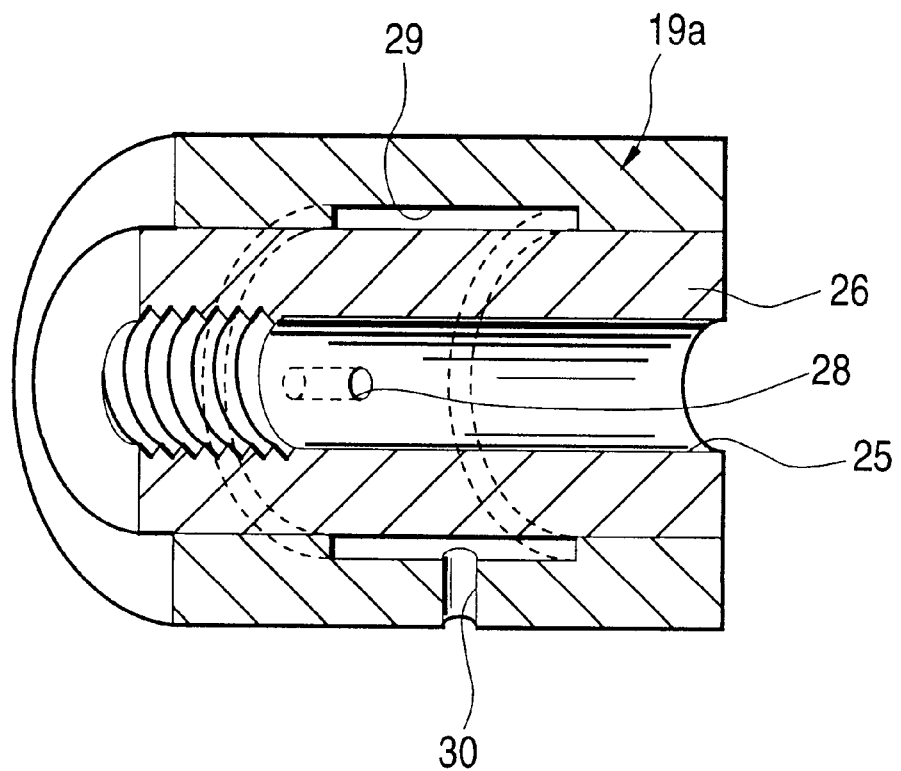
FIG. 3 is a half-cutaway perspective view showing only the portion B taken out from FIG. 1.
Figure 9:
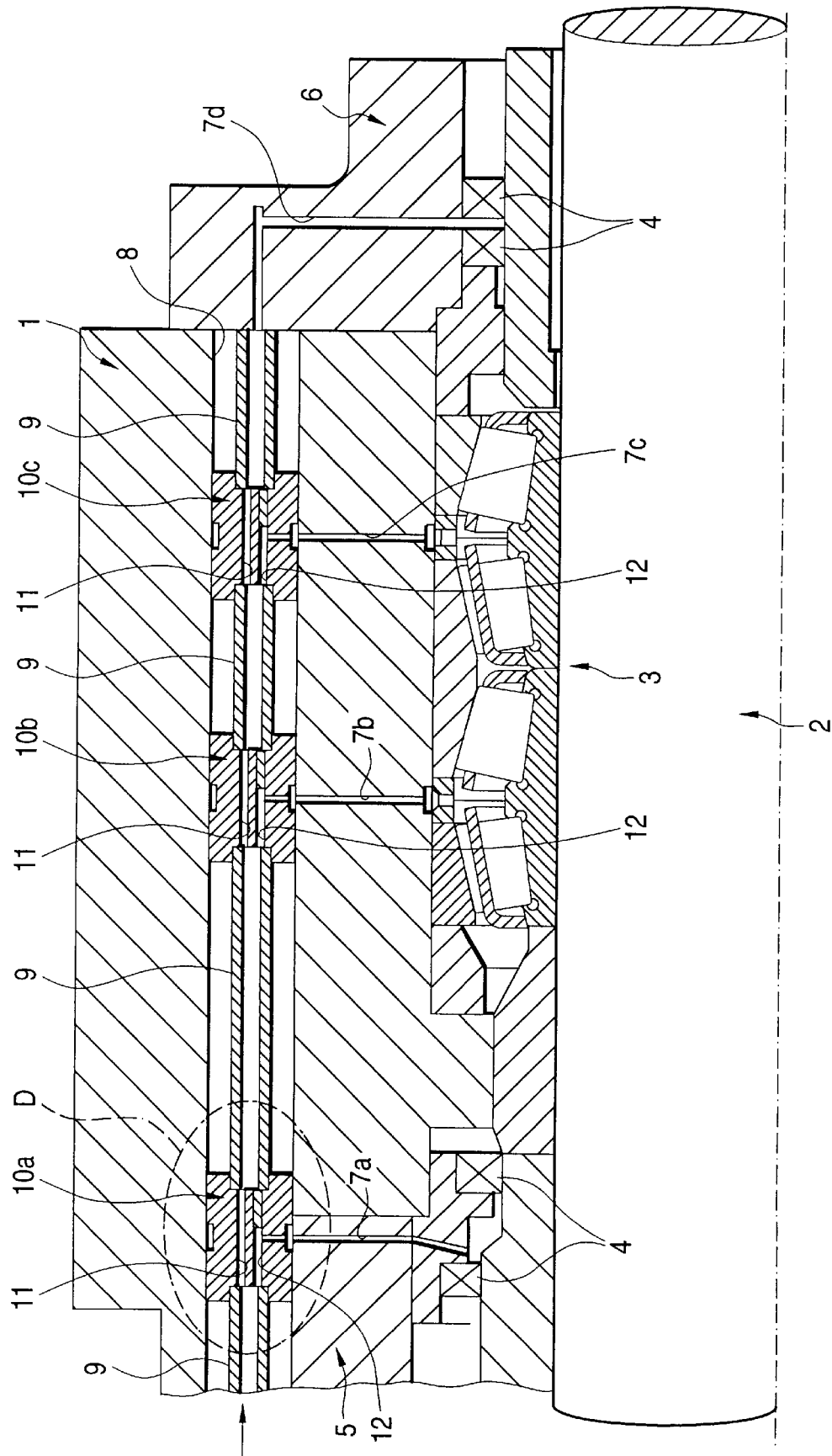
FIG. 9 is a sectional view showing an example of the conventional structure.
Figure 10:
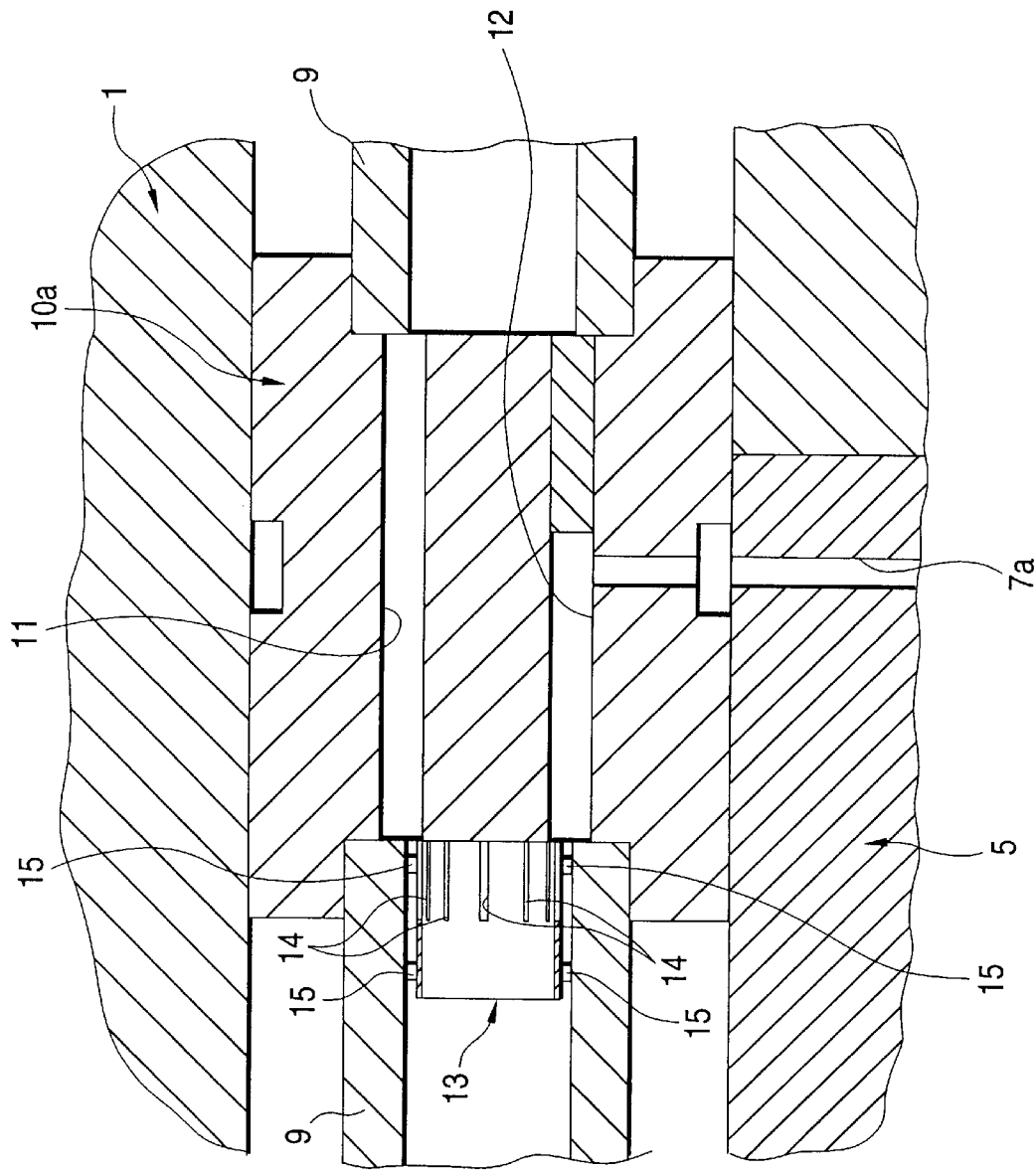
FIG. 10 is an enlarged view of the portion D in FIG. 9.

FIGS. 1 to 3 show a first embodiment of the present invention. The feature of this oil air lubricating apparatus according to the invention is in the structure of an oil air distributor 17 provided in the inside of a support hole 8a provided in a housing 16. The structure of a portion in which a plurality of branch passages 7a and 7b are provided for supplying lubricating oil to a portion supporting a rotation shaft 2 (see FIG. 9) rotatably relative to the housing 16 is the same as the preliminarily described conventional structure. Although this embodiment shows the case where the number of branch passages for supplying lubricating oil is two for the sake of simplification of description, the number of branch passages may be not smaller than three.

The oil air lubricating apparatus according to the present invention comprises: a support hole 8a provided in the inside of the housing 16; a plurality of branch passages 7a and 7b each having one end (upper end in FIG. 1) opened to the inner circumferential surface of the support hole 8a and the other end (lower end in FIG. 1) opened to a portion to be lubricated, such as a not-shown roller bearing, or the like; and an oil air distributor 17 provided in the inside of the support hole 8a. The one-end-side openings of the branch passages 7a and 7b are opened in axially separate positions respectively on the inner circumferential surface of the support hole 8a.

The oil air distributor 17 is constituted by: an inner pipe 18; a plurality of outer pipes 19a and 19b (two in FIG. 1) which can be fitted onto the inner pipe 18 with fine gaps therebetween; a cylindrical spacer 20; a supply plug 22 having a connection portion 21 which can be connected to an opening end portion of the support hole 8a through thread-engagement; and a plurality of seal rings 24, 24 which are annular sealing members respectively. The inner pipe 18 has a bottomed-cylinder-shaped pipe portion 26 and a flange portion 27. The pipe portion 26 is opened at this one end side (left in FIG. 1) and provided with a first oil-supply hole 25 formed in its inside. The flange portion 27 is provided on the outer circumferential surface of the other end portion (right end portion in FIG. 1) of the pipe portion 26. The inner pipe 18 can be inserted into the inside of the support hole 8a. Further, a plurality of inner-pipe-side small holes 28, 28 are formed in an intermediate portion of the pipe portion 26 so as to be disposed in axially separate positions, in circumferentially even-level positions and in radially opposite positions, so that the inner and outer circumferential surfaces of the pipe portion 26 are communicated with each other through those small holes 28, 28.

Further, each of the outer pipes 19a and 19b can be fitted onto the pipe portion 26 of the inner pipe 18 with a fine gap and can be inserted into the support hole 8a. First recessed grooves 29, 29 are provided in axially intermediate portions over the whole inner circumferential surfaces of the outer pipes 19a and 19b respectively. Further, an outer-pipe-side small hole 30 is formed in a part of each of the outer pipes 19a and 19b so that the bottom surfaces of the first recessed grooves 29, 29 are communicated with the outer circumferential surfaces of the outer pipes 19a and 19b respectively. Incidentally, in the embodiment shown in the drawings, the inner-pipe-side small holes 28, 28 and the outer-pipe-side small holes 30, 30 are provided so that one inner-pipe-side small hole 28 and one outer-pipe-side small hole 30 are formed in one (left in FIG. 1) outer pipe 19a and two inner-pipe-side small holes 28, 28 and two outer-pipe-side small holes 30, 30 are formed in the other (right in FIG. 1) outer pipe 19b. Further, the inner-pipe-side small holes 28, 28, the first recessed grooves 29, 29, the outer-pipe-side small holes 30, 30 and the branch passages 7a and 7b are located axially as follows. When the seal rings 24, 24 are compressed between the supply plug 22 and the flange portion 27 provided in the inner pipe 18 in the condition in which the outer pipes 19a and 19b, the seal rings 24, 24 and the spacer 20 are fitted onto the inner pipe 18, the inner-pipe-side small holes 28, 28 are matched with the first recessed grooves 29, 29 so that not only the inner-pipe-side small holes 28, 28 are communicated with the outer-pipe-side small holes 30, 30 respectively but also the outer-pipe-side small holes 30, 30 are communicated, respectively, with the branch passages 7a and 7b provided in the housing 16. Incidentally, in this embodiment, second recessed grooves 34, 34 are formed in the inner circumferential surface of the support hole 8a so as to be located in positions axially matched with the branch passages 7a and 7b respectively. The circumferential position restriction on fixture of the outer pipes 19a and 19b to the support hole 8a is made unnecessary because of the second recessed grooves 34, 34. Incidentally, the second recessed grooves 34, 34 may be formed in axially intermediate portions of the outer circumferential surfaces of the outer pipes 19a and 19b, respectively, instead of the inner circumferential surface of the support hole 8a. Further, the spacer 20 has a function for limiting the interval between the outer pipes 19a and 19b.

Further, the supply plug 22 has a connection portion 21 which can be connected to the opening portion of the support hole 8a through thread-engagement, and a second oil-supply hole 31 for making the axially opposite end surfaces communicate with each other. In this example, the outer circumferential surface of the connection portion 21 is provided as a male screw portion so that the male screw portion can be thread-engaged with a female screw portion formed in the opening end portion of the support hole 8a. Further, a second flange portion 32 protruded radially outward is formed on the outer circumferential surface of the supply plug 22.

The constituent members of the oil air distributor 17 configured as described above are used in combination as shown in FIG. 1. That is, the outer pipes 19a and 19b and the spacer 20 are fitted, through the seal rings 24, 24, onto the outer circumferential surface of the pipe portion 26 constituting the inner pipe 18. The outer pipes 19a and 19b, the spacer 20 and the seal rings 24, 24 are axially held between a surface (left surface in FIG. 1) of the flange portion 27 provided in the inner pipe 18 and the connection portion 21 side end surface of the supply plug 22. Incidentally, the outer diameter of each of the seal rings 24, 24 is selected to be slightly smaller than the diameter of the support hole 8a in the condition in which the seal rings 24, 24 are fitted onto the pipe portion 26 of the inner pipe 18 so that the oil air distributor 17 with the seal rings 24, 24 can be inserted in the inside of the support hole 8a easily.

The thus assembled oil air distributor 17 is inserted in the inside of the support hole 8a. Then, the male screw portion provided in the connection portion 21 of the supply plug 22 is thread-engaged with the female screw portion provided in the opening end portion of the support hole 8a and tightened. The seal rings 24, 24 are compressed in this condition so that not only the inner circumferential edges of the seal rings 24, 24 are elastically pressed against the outer circumferential surface of the pipe portion 26 all over the whole circumference but also the outer circumferential edges of the seal rings 24, 24 are elastically pressed against the inner circumferential surface of the support hole 8a all over the whole circumference. Further, in this condition, the first oil-supply hole 25 and the second oil-supply hole 31 are communicated with each other, the inner-pipe-side small holes 28, 28 and the outer-pipe-side small holes 30, 30 are communicated with each other, and the outer-pipe-side small holes 30, 30 and the branch passages 7a and 7b provided in the housing 16 are communicated with each other.

Further, in the case where the oil air distributor 17 is inserted in the inside of the support hole 8a in the aforementioned manner, the inner-pipe-side small holes 28, 28 provided in the inner pipe 18 are limited so as to be opened substantially horizontally (at least to a portion except the neighborhood of the lower end portion in the circumferential direction) in the inner circumferential surface of the first oil-supply hole 25. Incidentally, in this example, a packing 33 is interposed between the second flange portion 32 of the supply plug 22 and the opening circumferential edge portion of the support hole 8a so that oil tightness between the supply plug 22 and the support hole 8a is held.

In the oil air lubricating apparatus configured as described above according to the present invention, constituent members of the oil air distributor 17 can be handled collectively in the condition in which the constituent members are assembled into one body even in the case where the number of portions for supplying lubricating oil is two or more. Further, because the shape per se of each constituent member is relatively simple, the structure is simplified and the assembling work is facilitated so that the cost of the apparatus is reduced. That is, at the time of the assembling work, the oil supply source led to the second oil-supply hole 31 provided in the supply plug 22 can be communicated with portions to be lubricated through the branch passages 7a and 7b provided in the housing 16 simply by an operation in which the supply plug 22 is fixed thread-engaged with the opening portion of the support hole 8a to compress the sealing members 24, 24 after the oil air distributor 17 including the outer pipes 19a and 19b, sealing members 24, 24 and spacer 20 fitted onto the inner pipe 18 is inserted in the inside of the support hole 8a provided in the housing 16. Accordingly, no exclusive-use jig and complex labor are required for the assembling work to secure the aforementioned communication state. Although this embodiment has shown the case where the number of portions to be supplied with lubricating oil is two and the number of branch passages 7a and 7b is two, the present invention can be applied to the case where the number of portions to be supplied with lubricating oil is not smaller than three if a separate outer pipe, a separate spacer, etc. are used in combination. Also in this case, easy handling is obtained, so that the production cost for the apparatus is reduced.

Further, according to the illustrated oil air lubricating apparatus, a plurality of inner-pipe-side small holes 28, 28 are opened substantially horizontally in vertically even-level positions in the inner circumferential surface of the first oil-supply hole 25. Accordingly, lubricating oil can be fed into the inner-pipe-side small holes 28, 28 uniformly even in the case where the lubricating oil is reserved in the lower portion of the inside of the first oil-supply hole 25 by the influence of the gravity. Incidentally, in the illustrated example, the female screw portion 23 formed in the opening portion of the first oil-supply hole 25 is used for thread-engagement with the top end portion of a bolt used as a clue to go on when the oil air distributor 17 is drawn out of the support hole 8a.

Figure 4:
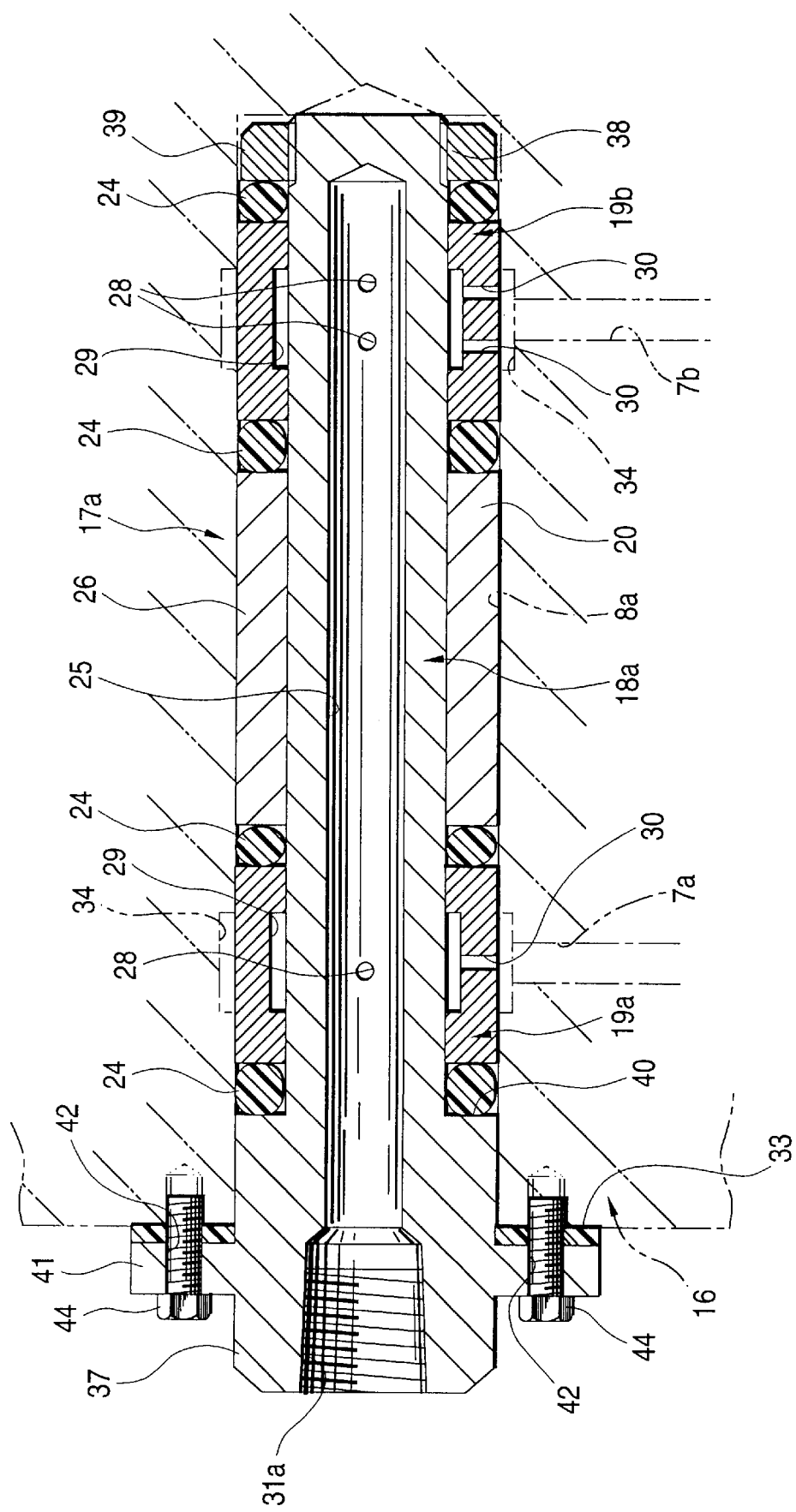
FIG. 4 is a sectional view showing a second embodiment of the present invention.

Next, FIG. 4 shows a second embodiment of the invention. An oil air lubricating apparatus of the embodiment, unlike that of the first embodiment, is not provided with the supply plug 22 or the flange portion 27 (see FIG. 1). Instead, an oil air distributor 17a forming a part of the oil air lubricating apparatus comprises a supply plug portion 37 integral with an inner pipe 18a in one end thereof (left end part of FIG. 4), a male screw portion 38 formed on the outer peripheral surface of an opposite end of the inner pipe 18a (right end part of FIG. 4), and a nut 39 that can be screwed into the male screw portion 38. The supply plug portion 37 and a pipe portion 26 disposed from an intermediate part of the inner pipe 18a to an opposite half part are made contiguous by a step portion 40. The supply plug portion 37 is formed in a part of the outer peripheral surface with a third flange portion 41 projected diametrically outward and the third flange portion 41 is formed with a plurality of through holes 42, 42 axially penetrating the third flange portion 41. One side of the third flange portion 41 (left side face of FIG. 4) can be abutted via a packing 33 against a portion existing in an opening fringe part of a support hole 8a made in a housing 16 on the outer face of the housing 16 with the inner pipe 18a inserted into the support hole 8a. In this state, the through holes 42, 42 made in the third flange portion 41 can be aligned with bolt holes 43, 43 made in a portion positioned in the opening fringe part of the support hole 8a in a part of the outer face of the housing 16. With the through holes 42, 42 aligned with the bolt holes 43, 43, bolts 44, 44 inserted into the through holes 42, 42 are screwed into the bolt holes 43, 43, whereby the supply plug portion 37 is joined to the housing 16. Therefore, in the embodiment, the supply plug portion 37 is not formed on the outer peripheral surface with the male screw portion (see FIG. 1) provided to enable the supply plug 22 in the first embodiment to be joined to the housing 16.

The members making up the oil air distributor 17a are combined in a state in which the inner pipe 18a is not inserted into the support hole 8a, as shown in FIG. 4. That is, with the inner pipe 18a not inserted into the support hole 8a, two outer pipes 19a and 19b and one spacer 20 are fitted onto the outer peripheral surface of the pipe portion 26 forming the inner pipe 18a via a plurality of seal rings 24, 24, and the nut 39 is screwed into the male screw portion 38 provided on the outer peripheral surface of the opposite end of the pipe portion, whereby the outer pipes 19a and 19b, the spacer 20, and the seal rings 24, 24 are sandwiched axially between one side of the nut 39 (left side face of FIG. 4) and the step portion 40, one side of the supply plug par 37 (right side face of FIG. 4), and the seal rings 24 and 24 are compressed axially. In this state, the outer diameter of each seal ring 24, 24 is made a little larger than the inner diameter of the support hole 8a.

The oil air distributor 17a with the members thus combined is inserted into the support hole 8a, the third flange portion 41 is struck against the outer face of the housing 16 via the packing 33, and the through holes 42, 42 made in the third flange portion 41 and the bolt holes 43, 43 made in the housing 16 are aligned with each other. In this state, the opposite end face of the inner pipe 18a faces the deep end face of the support hole 8a with a gap between. In this state, the bolts 44 and 44 inserted into the through holes 42 and 42 are screwed into the bolt holes 43 and 43 and further are tightened for joining and fixing the supply plug portion 37 to the housing 16. In this state, the seal rings 24, 24 are compressed diametrically between the outer peripheral surface of the inner pipe 18a and the inner peripheral surface of the support hole 8a and the inner and outer fringes of the seal rings 24, 24 are elastically abutted against the outer peripheral surface of the pipe portion 26 and the inner peripheral surface of the support hole 8a over all peripheries. A first oil supply hole 25 made in the pipe portion 26 and a second oil supply hole 31a made in the supply plug portion 37 communicate with each other; the inner-pipe-side small holes 28, 28 made in the pipe portion 26 and the outer-pipe-side small holes 30, 30 made in the outer pipes 19a, 19b communicate with each other; and the outer-pipe-side small holes 30, 30 and branch passages 7a, 7b defined in the housing 16 communicate with each other.

With the oil air lubricating apparatus of the embodiment configured as described above, the oil air distributor 17a can be handled reliably in one piece in a state before it is fitted into the housing 16, thus handleability of the oil air distributor 17a furthermore improves as compared with that in the first embodiment and the fitting work of the oil air lubricating apparatus can be furthermore facilitated accordingly. Further, in the second embodiment, the supply plug portion 37 is joined to the housing 16 with the bolts 44, 44, thus the inner-pipe-side small holes 28, 28 made in the inner pipe 18a can be reliably opened almost horizontally at the same position in the height direction of the inner peripheral surface of the first oil supply hole 25. That is, in the first embodiment, the inner pipe 19a and the supply plug 21 (FIG. 1) having a portion that can be joined to the housing 16 are separate and there is the possibility that the opening positions and opening directions of the inner-pipe-side small holes 28, 28 may be unable to be reliably made predetermined ones. In contrast, in the second embodiment, the inner pipe 18a and the supply plug portion 37 having a portion that can be joined to the housing 16 are formed in one piece and to fix the inner pipe 18a to the inside of the support hole 8a, the inner pipe 18a is joined and fixed to the housing 16 by means of the bolts 44, 44 in a state in which the through holes 42, 42 made in the third flange portion 41 of the supply plug portion 37 and the bolt holes 43, 43 made in the housing 16 are aligned with each other. Therefore, if the positional relationship between the through holes 42, 42 and the inner-pipe-side small holes 28, 28 is properly regulated, the inner-pipe-side small holes 28, 28 can be reliably opened almost horizontally at the same position in the height direction of the inner peripheral surface of the first oil supply hole 25. Therefore, in the embodiment, even if the lubricating oil supply amount is minute and the lubricating oil accumulates in the bottom because of the effect of gravity in the first oil supply hole 25, the lubricating oil can be stably supplied to the branch passages 7a and 7b defined in the housing 16.

Other components similar to those previously described in the first embodiment are denoted by the same reference numerals and will not be discussed again.

Figure 5:
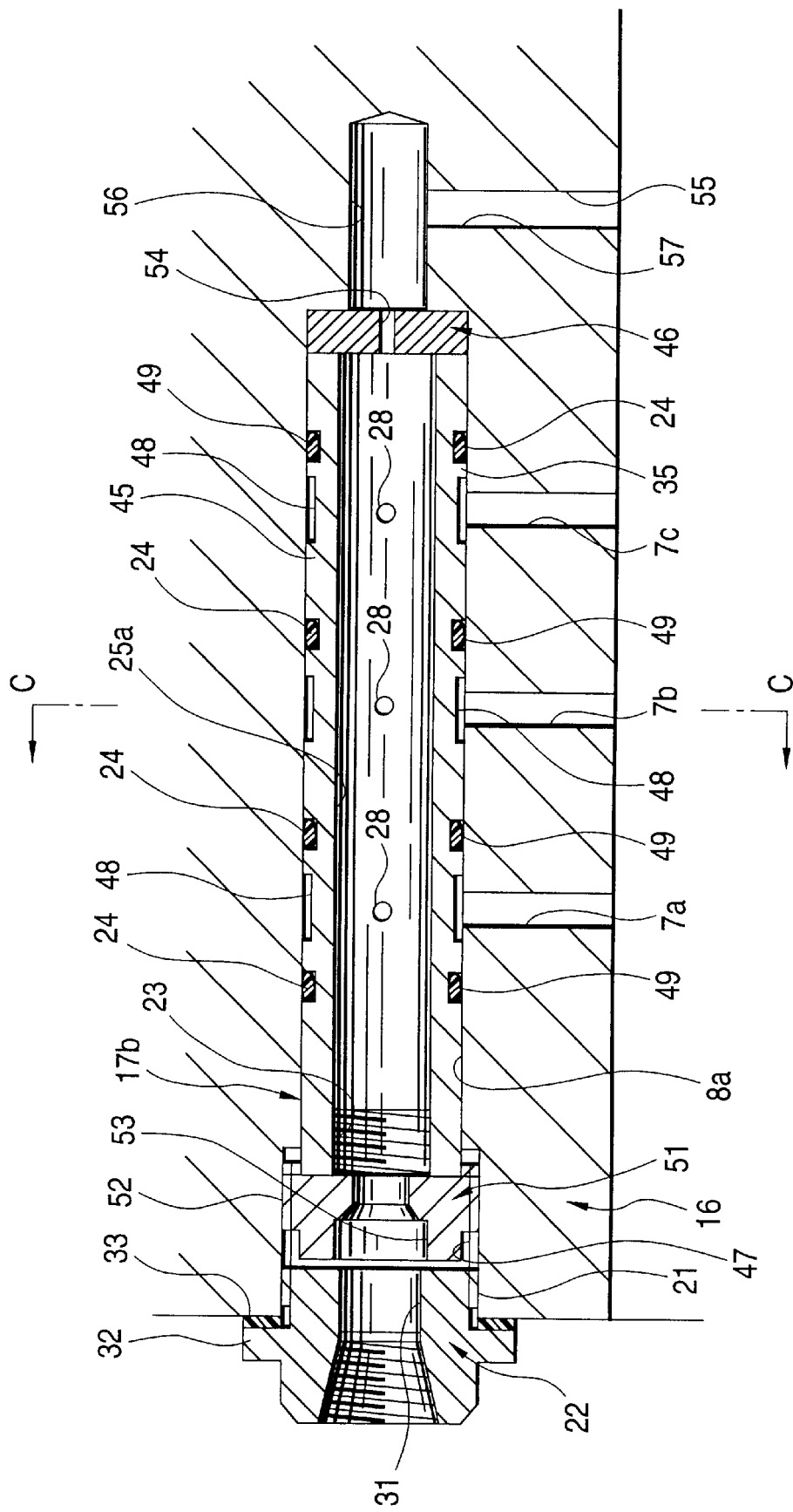
FIG. 5 is a sectional view showing a third embodiment of the present invention.
Figure 6:
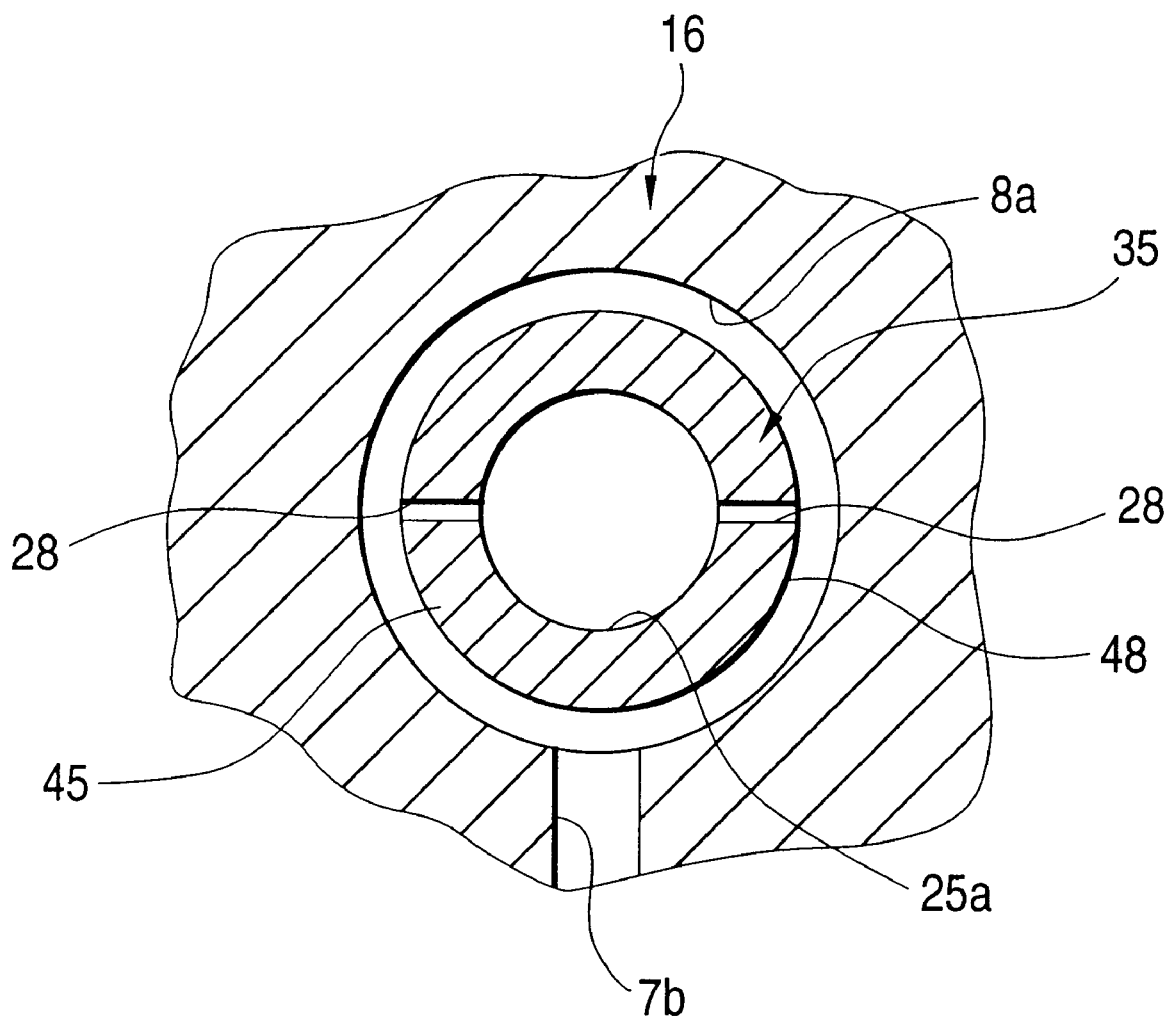
FIG. 6 is a sectional view taken along the line C—C in FIG. 1.

Next, FIGS. 5 and 6 show a third embodiment of the invention. An oil air lubricating apparatus of the embodiment, unlike those of the above-mentioned embodiments, is not provided with the outer pipes 19a, 19b (see FIGS. 1 to 4). Instead, an inner pipe 35 forming a part of an oil air distributor 17b is made up of a pipe portion 45 containing a first oil supply hole 25a opened to one axial end (left end of FIG. 5) and a bottom plate portion 46 for closing an opening at an opposite end of the first oil supply hole 25a (right end of FIG. 5); it is shaped like a closed-end cylinder as a whole. To form the inner pipe 35 as described above, in the embodiment, a disk-like member is joined and fixed to a cylinder-like member formed in the inside with the first oil supply hole 25a axially penetrating the cylinder-like member by welding in a state in which the opening at the opposite end of the first oil supply hole 25a is closed. The inner pipe 35 can be inserted into a support hole 8a made in a part of a housing 16 and one end of the inner pipe 35 (left end of FIG. 5) projects to the inside of a female screw portion 47 formed in the opening end of the support hole 8a in a state in which the inner pipe 35 is inserted into the support hole 8a until an opposite end of the inner pipe 35 strikes against the deep end of the support hole 8a.

A plurality of recessed grooves 48, 48 are formed at axially different positions on the outer peripheral surface of the pipe portion 45 over all periphery and a plurality of seal grooves 49, 49 are formed at positions axially apart from the recessed grooves 48, 48 over all periphery. A plurality of small holes on the inner pipe side 28, 28 to allow the bottoms of the recessed grooves 48, 48 and the inner peripheral surface of the pipe portion 45 to communicate with each other are made so as to be spaced from each other in the axial direction of an intermediate part of the pipe portion 45 at the same position in the circumferential direction and at diametrically opposite positions.

The inner pipe 35 thus formed, a nut member 51, and a supply plug 22 make up the oil air distributor 17b. The nut member 51 is formed on the outer peripheral surface with a male screw portion 52 that can be screwed into the female screw portion 47 disposed at the end of the opening of the support hole 8a and contains a third oil supply hole 53 axially penetrating the nut member 51. The nut member 51 is screwed into the female screw portion 47, whereby it is joined to the housing 16. The axial length of the nut member 51 is regulated to the length to allow a male screw portion of a connection portion 21 of the supply plug 22 to be screwed into the opening end of the female screw portion 47 in a state in which the inner pipe 35 is inserted into the support hole 8a until an opposite end of the inner pipe 35 strikes against the deep end of the support hold 8a and the nut member 51 is screwed hole into the deep end of the female screw portion 47.

In the embodiment, a small hole 54 axially penetrating the bottom plate portion 46 is made in the center of the bottom plate portion 46. The housing 16 contains a second branch passage 55 with an upstream end opened on the deep end face of the support hole 8a and a downstream end opened in a portion to be lubricated. That is, the second branch passage 55 is made up of a concave hole 56 opening the upstream end in the center of the deep end face of the support hold 8a and a through hole 57 opening the upstream end on the inner peripheral surface of the concave hole 56 and the downstream end in the portion to be lubricated. With the inner pipe 35 inserted into the support hole 8a, the small hole 54 made in the bottom plate portion 46 of the inner pipe 35 and the second branch passage 55 are made to communicate with each other.

The members making up the oil air distributor 17b formed as described above are inserted into the support hole 8a with the members assembled as shown in FIG. 5 or are assembled as shown in FIG. 5 with the members inserted into the support hole 8a. That is, annular seal rings 24, 24 are fitted into the seal grooves 49, 49 formed on the outer peripheral surface of the inner pipe 35. In this state, the outer diameter of each seal ring 24, 24 becomes a little larger than the inner diameter of the support hole 8a. With the bottom plate portion 46 positioned on the deep end side of the support hole 8a, the inner pipe 35 is inserted into the support hold 8a. Next, the nut member 51 is screwed into the female screw portion 47 and is further tightened until one side of the nut member 51 (right side face of FIG. 5) strikes against one end face of the inner pipe 35, whereby the inner pipe 35 is sandwiched between the one side of the nut member 51 and the deep end face of the support hold 8a and is fixed to the housing 16 together with the nut member 51. Last, the male screw portion of the supply plug 22 is screwed into the opening end of the female screw portion 47 for joining and fixing the supply plug 22 to the housing 16.

In this state, the seal rings 24, 24 are compressed diametrically between the bottoms of the seal grooves 49, 49 and the inner peripheral surface of the support hole 8a and the inner and outer fringes of the seal rings 24, 24 are elastically abutted against the bottoms of the seal grooves 49, 49 and the inner peripheral surface of the support hole 8a over all peripheries. In this state, a first oil supply hole 25a made in the inner pipe 35 and a second oil supply hole 31 made in the supply plug 22 communicate with each other; the inner-pipe-side small holes 28, 28 made in the inner pipe 35 and branch passages 7a, 7b, and 7c defined in the housing 16 communicate with each other; and the small hole 54 made in the bottom plate portion 46 and the second branch passage 55 defined in the housing 16 communicate with each other.

Since the oil air lubricating apparatus of the embodiment configured as described above has a structure wherein the outer pipes 19a and 19b are excluded from the oil air lubricating apparatus of the first or second embodiment, the number of parts of the oil air distributor 17b can be lessened. Further, unlike the inner pipes in the first and second embodiments, the inner pipe 35 forming a part of the oil air distributor 17b need not be formed with the flange portion 27 (FIG. 1), the male screw portion 38 (FIG. 4), etc., and thus can be manufactured at low costs simply by applying easy working to a material such as a carbon steel pipe for pressure piping. Further, fitting work required to make the oil supply source leading to the second oil supply hole 31 communicate with the portions to be lubricated to which the branch passages 7a, 7b, 7c and 55 defined in the housing 16 lead can be furthermore facilitated. Therefore, in the embodiment, the whole costs of the oil air lubricating apparatus can be reduced.

Further, in the embodiment, the small hole 54 axially penetrating the bottom plate portion 46 forming a part of the inner pipe 35 is made in the bottom plate portion 46 and the second branch passage 55 made to communicate with the small hole 54 is defined in the housing 16, so that a large number of portions to be lubricated can be provided. In the embodiment, the small hole 54 is made in the center of the bottom plate portion 46. Thus, if the inner-pipe-side small holes 28, 28 made in the pipe portion 45 are opened almost horizontally at the same position in the height direction on the inner peripheral surface of the first oil supply hole 25a with the inner pipe 35 inserted into the support hole 8a, the small hole 54 made in the bottom plate portion 46 and the inner-pipe-side small holes 28, 28 become the same in height position and equal amounts of lubricating oil can be supplied to the holes 54 and 28.

Other components similar to those previously described in the first embodiment are denoted by the same reference numerals and will not be discussed again.

Figure 7:
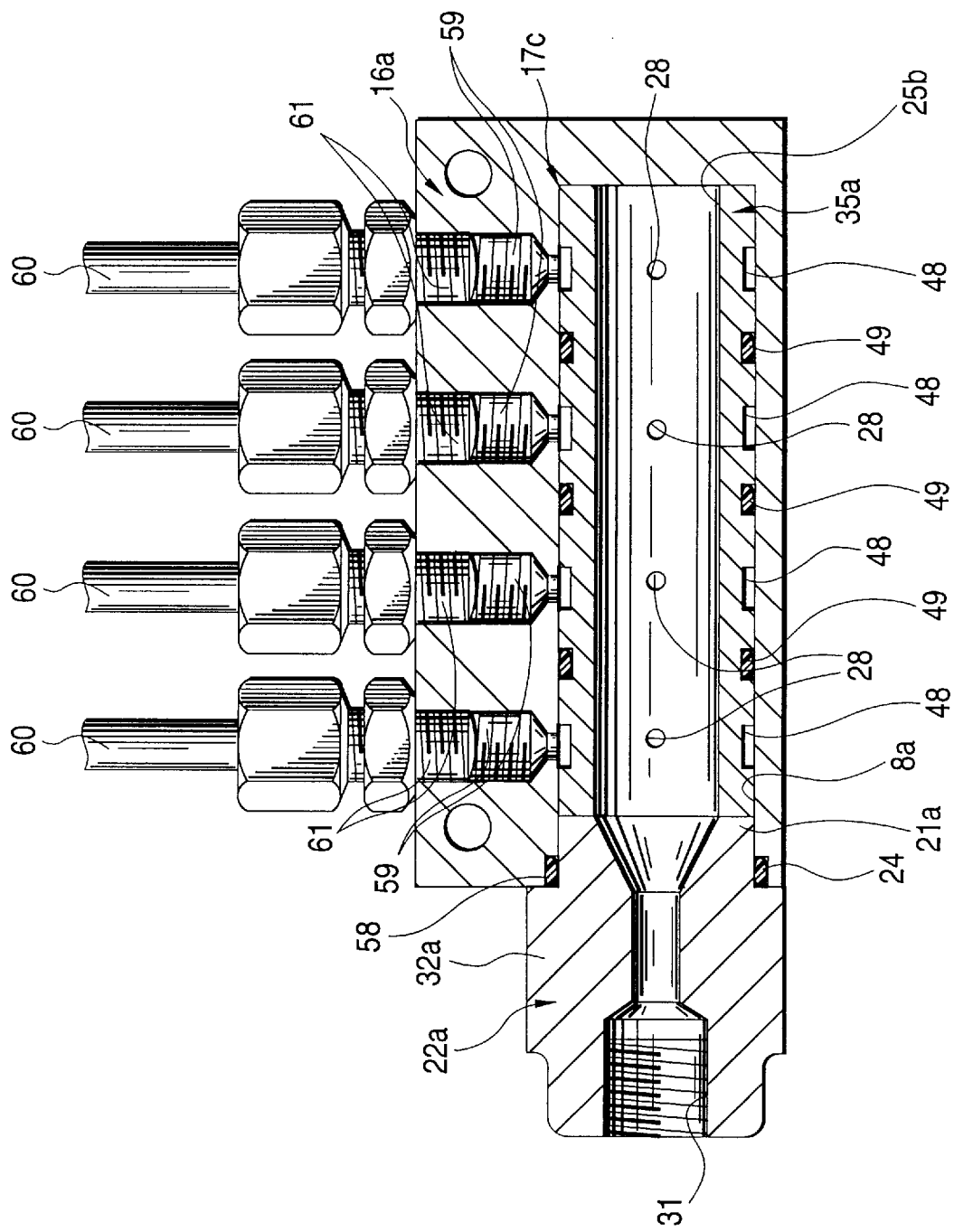
FIG. 7 is a sectional view showing a fourth embodiment of the present invention.
Figure 8:
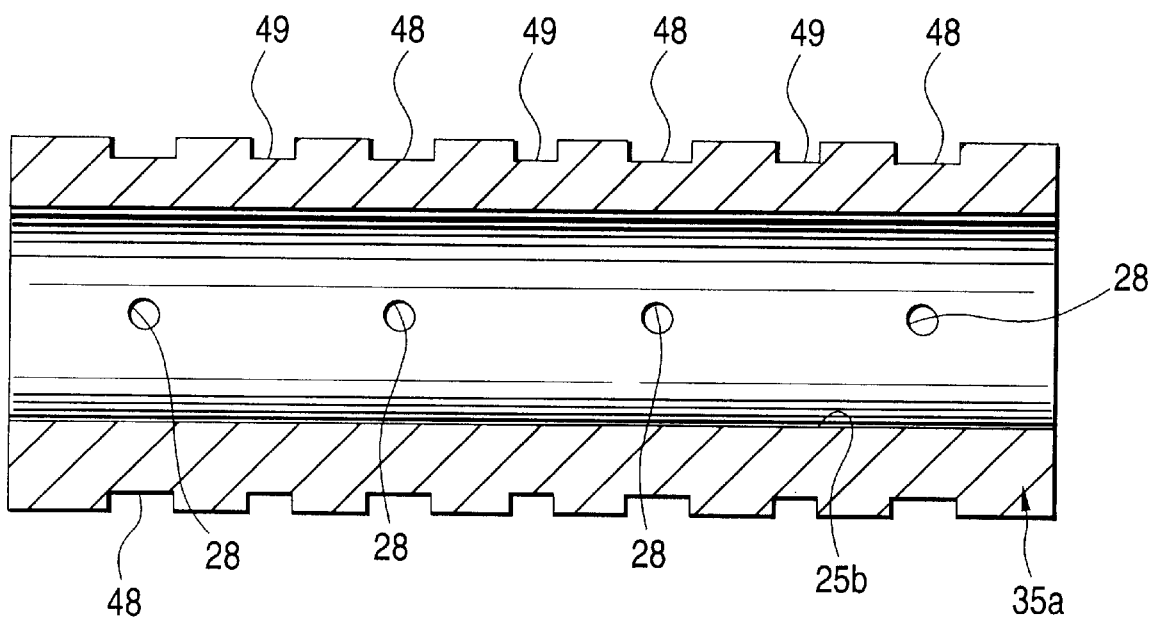
FIG. 8 is a sectional view of an inner pipe in FIG. 7.

Next, FIGS. 7 and 8 show a fourth embodiment of the invention. In an oil air lubricating apparatus of the embodiment, an inner pipe 35a forming a part of an oil air distributor 17c is shaped almost like a cylinder as a whole and contains a first oil supply hole 25b axially penetrating the inner pipe 35a. Like the inner pipe 35 in the third embodiment (FIGS. 5 and 6), the inner pipe 36a is formed on the outer peripheral surface with a plurality of recessed grooves 48, 48 and a plurality of seal grooves 49, 49 over all periphery. A plurality of inner-pipe-side small holes 28, 28 to allow the bottoms of the recessed grooves 48, 48 and the inner peripheral surface of the inner pipe portion 35a to communicate with each other are made so as to be spaced from each other in the axial direction of an intermediate part of the inner pipe 35 at the same position in the circumferential direction and at diametrically opposite positions. The inner pipe 35a can be inserted into a support hole 8a made in a housing 16a and both end faces of the inner pipe 35a can be struck against one end face of a supply plug 22a and the deep end face of the support hole 8a. In the embodiment, unlike the third embodiment, the second branch passage 55 (FIG. 5) is not defined in the housing 16a. The female screw portion 47 as in the first or third embodiment (see FIG. 1, FIG. 5) is not formed in an opening end of the support hole 8a; instead, a seal groove 58 is formed over all periphery. The supply plug 22a can be joined to the opening end of the support hole 8a. That is, the supply plug 22a has the outer peripheral surface of one end (right end of FIG. 7) as a simple cylindrical face and is formed with a second flange portion 32a on the outer peripheral surface of an intermediate part. The one end of the supply plug 22a is pressed into the opening end of the support hole 8a, whereby the supply plug 22a can be joined and fixed to the housing 16a.

Particularly in the embodiment, the housing 16a forming a part of the oil air lubricating apparatus contains a plurality of branch passages 59, 59 each having an upstream end opened on the inner peripheral surface of the support hole 8a and a downstream end opened on the outer face of the housing 16a. Upstream ends of oil air supply pipings 60, 60 are connected to opposite end openings of the branch passages 59, 59 opened on the outer face of the housing 16a by pipe joints 61, 61. Downstream ends of the oil air supply pipings 60, 60 (not shown) are connected to another housing (not shown) provided with a portion to be lubricated, such as a support part of a rolling bearing, whereby the oil air supply pipings 60, 60 are made to communicate with the portion to be lubricated. The structure of joining the oil air supply pipings 60, 60 to the ends of the branch passages 59, 59 defined in the housing 16a as described above is generally known and therefore a detailed description of the connection parts of the oil air supply pipings 60, 60 is omitted.

To assemble the oil air lubricating apparatus configured as described above, the inner pipe 35a is inserted into the support hole 8a with seal rings 24, 24 fitted into the seal grooves 49, 49 formed in the outer peripheral surface of the inner pipe 35a. In this state, a connection portion 21a of the supply plug 22a is pressed into the opening end of the support hole 8a, whereby the supply plug 22a is joined and fixed to the housing 16a and the inner pipe 35a is sandwiched between the one end face of the supply plug 22a and the deep end face of the support hole 8a for fixing the inner pipe 35a to the housing 16a. In this state, annular seal ring 24 is fitted into the seal groove 58 formed in the opening end of the support hole 8a, whereby the seal ring 24 is compressed elastically between the bottom of the seal groove 58 and the outer peripheral surface of the supply plug 22a for holding oil-sealing relation between the support hole 8a and the supply plug 22a. In this state, the first oil supply hole 25b made in the inner pipe 35a and the second oil supply hole 31 made in the supply plug 22a communicate with each other and the inner-pipe-side small holes 28, 28 made in the inner pipe 35a and the branch passages 59, 59 defined in the housing 16a communicate with each other.

According to the oil air lubricating apparatus of the embodiment configured as described above, a so-called installation-type oil air distributor with the housing 16a into which the oil air distributor 17c is fitted separate from a housing (not shown) provided with a portion to be lubricated, such as a support part of a rolling bearing, can be provided. Therefore, the housing 16a into which the oil air distributor 17c is fitted can be miniaturized, the flexibility of the installation position of the housing 16a can be improved, and effective use of the space in which the whole oil air lubricating apparatus is built can be made. For example, the housing 16a into which the oil air distributor 17c is fitted is fixed to the top, etc., of another housing (not shown) provided with a portion to be lubricated.

With the oil air lubricating apparatus of the embodiment configured and functioning as described above, the shape of the inner pipe 35a forming a part of the oil air distributor 17c can be simplified, the manufacturing costs of the parts can be reduced, and the whole costs of the oil air lubricating apparatus can be decreased.

Because the present invention is configured so as to operate as described above, it is possible to provide an oil air lubricating apparatus in which not only cost is reduced by simplification of machining of parts and reduction of labor for the assembling work but also proper quantities of lubricating oil can be distributed.

What is claimed is:

1. An oil air lubricating apparatus comprising:

(1) a housing provided with a support hole;

(2) a plurality of branch passages formed in an inside of said housing, said branch passages having respective one ends opened in axially separate positions in an inner circumferential surface of said support hole and respective other ends communicated with portions to be lubricated respectively; and (3) an oil air distributor provided in an inside of said support hole;

said oil air distributor including:

(3a) an inner pipe having a pipe portion provided with a first oil-supply hole formed in an inside of said pipe portion, said pipe portion being opened in one end side thereof, said inner pipe being inserted into the inside of said support hole;

(3b) a plurality of inner-pipe-side small holes provided in an intermediate portion of said pipe portion and formed in axially separate positions respectively so as to communicate inner and outer circumferential surfaces of said pipe portion with each other;

(3c) a plurality of cylindrical outer pipes fitted onto said pipe portion and inserted into the inside of said support hole;

(3d) outer-pipe-side small holes for communicating outer circumferential surfaces of said outer pipes with bottom surfaces of recessed grooves formed in axially intermediate portions of inner circumferential surfaces of said outer pipes respectively;

(3e) a plurality of annular sealing members fitted onto part of said pipe portion and located in positions axially separated from said outer pipes respectively, (3f) means for holding (3a) to (3e) members in the inside of said support hole, said holding means having a connection portion which is connectable to an opening end portion of said support hole and a second oil-supply hole which makes axially opposite end surfaces with each other; and wherein, when said holding means is connected to the opening end portion of said support hole, outer fringes of said annular sealing members are elastically abutted against the inner circumferential surface of said support hole and inner fringes of said annular sealing members are elastically abutted against an outer circumferential surface of said inner pipe, so that said first oil-supply hole and said second oil-supply hole are communicated with each other, said inner-pipe-side small holes and said outer-pipe-side small holes are communicated with each other, respectively, and said outer-pipe side small holes and said branch passages provided in said housing are communicated with each other, respectively.

2. The oil air lubricating apparatus according to claim 1, wherein said holding means comprises a supply plug separate from said inner pipe.

3. The oil air lubricating apparatus according to claim 2, further comprising a flange portion disposed on an outer circumferential surface of an opposite end side of said pipe portion of said inner pipe and with said supply plug connected to said opening end portion of said support hole, said flange portion of said inner pipe and said outer pipes are sandwiched between one end surface of said supply plug and a deep end of said support hole via a plurality of said sealing members and said sealing members are compressed axially, thereby swelling diametrically.

4. The oil air lubricating apparatus according to claim 1, wherein said holding means comprises a supply plug portion integral with said inner pipe.

5. The oil air lubricating apparatus according to claim 4, wherein said oil air distributor further includes a screw part formed on an outer peripheral surface of an opposite end side of said inner pipe, and a nut screwed into said screw part, and wherein said inner pipe is inserted into said support hole with said outer pipes sandwiched between one side of said supply plug portion and one side of said nut screwed into said screw part via a plurality of said seal members.

6. The oil air lubricating apparatus according to claim 1, wherein an upstream end of oil air supply piping is connected to an opening of said other end of each of said branch passages on an outer surface of said housing, whereby a downstream end of each of said branch passage is made to lead to the portions to be lubricated.

7. The oil air lubricating apparatus according to claim 1, wherein said oil air distributor further includes a bottom plate disposed on an opposite end side of said pipe portion of said inner pipe, said bottom plate having a small hole made so as to axially penetrate said bottom plate, wherein said housing comprises a second branch passage being defined therein and having an upstream end opened on a deep end face of said support hole and a downstream end opened in a portion to be lubricated, and wherein said small hole of said bottom plate and said second branch passage are made to communicate with each other with said inner pipe inserted into said support hole.

8. An oil air lubricating apparatus comprising:

(1) a housing provided with a support hole;

(2) a plurality of branch passages formed in an inside of said housing, said branch passages having respective one ends opened in axially separate positions in an inner circumferential surface of said support hole and respective other ends communicated with portions to be lubricated respectively; and (3) an oil air distributor provided in an inside of said support hole;

said oil air distributor including:

(3a) an inner pipe having a pipe portion provided with a first oil-support hole formed in an inside of said pipe portion, said pipe portion being opened in one end side thereof, said inner pipe being inserted into the inside of said support hole;

(3b) a plurality of inner-pipe-side small holes provided in an intermediate portion of said pipe portion and formed in axially separate positions respectively so as to communicate inner and outer circumferential surfaces of said pipe portion with each other;

(3c) a plurality of annular sealing members fitted onto part of said pipe portion and located in positions axially separated from said other pipes respectively;

(3d) means for holding (3a) to (3c) members in the inside of said support hole, said holding means having a connection portion which is connectable to an opening end portion of said support hole and a second oil-supply hole which makes axially opposite end surfaces with each other; and a plurality of recessed grooves being formed at axially different positions on the outer circumferential surface of said inner pipe and having bottom surfaces made to communicate with said inner-pipe-side small holes and a plurality of seal grooves being formed at positions axially apart from said recessed grooves on the outer peripheral surface of said inner pipe, wherein said plurality of annular sealing members are fitted into said seal grooves, respectively, and said inner pipe is inserted into said support hole; and wherein, with said holding means connected to said opening end portion of said support hole, said sealing members are compressed diametrically between said bottom surfaces of said seal grooves and the inner circumferential surface of said support hole, and said inner-pipe-side small holes and said branch passages defined in said housing are made to communicate with each other, respectively.

* * * * *